Dec. 9, 1924.
S. HILLER
1,518,926
PROCESS FOR TREATING ORGANIC MATERIALS TO PRODUCE MEAL AND OIL
Filed April 28, 1924    3 Sheets-Sheet 3
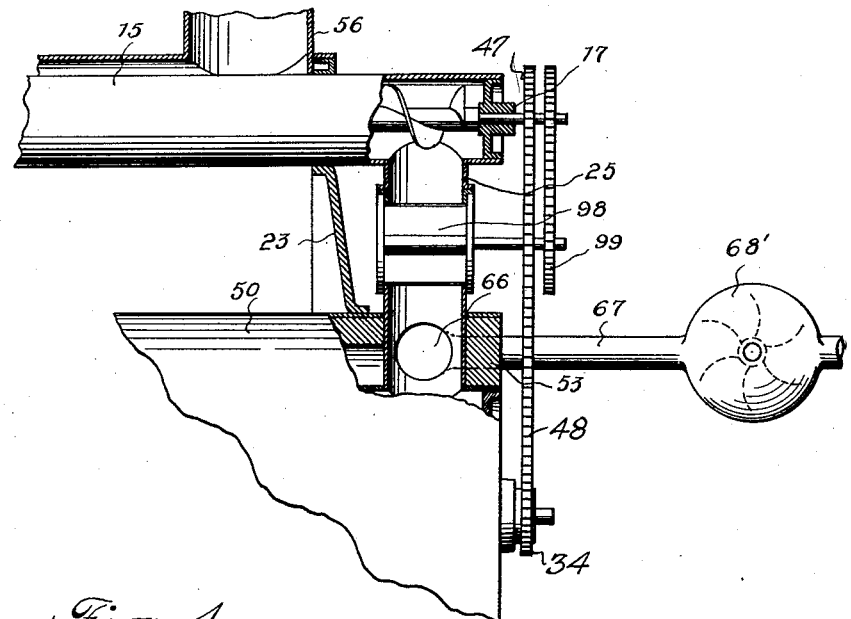
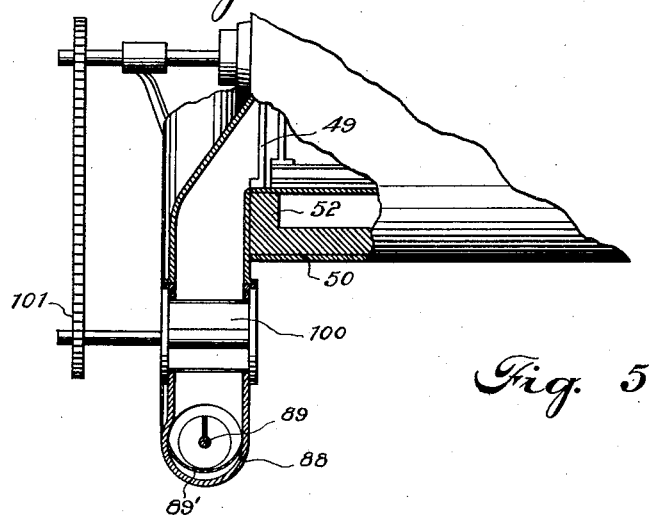
Inventor
Stanley Hiller
William A. Strauch
By
Attorney Patented Dec. 9, 1924.

1,518,926

UNITED STATES PATENT OFFICE.

STANLEY HILLER, OF SAN JOSE, CALIFORNIA, ASSIGNOR TO STANLEY HILLER INCORPORATED, OF SAN FRANCISCO, CALIFORNIA.

PROCESS FOR TREATING ORGANIC MATERIALS TO PRODUCE MEAL AND OIL.

Application filed April 23, 1924. Serial No. 709,652.

*To all whom it may concern:*

Be it known that I, STANLEY HILLER, a citizen of the United States, residing at San Jose, in the county of Santa Clara and State of California, have invented certain new and useful Improvements in Processes for Treating Organic Materials to Produce Meal and Oil, of which the following is a specification.

The present invention relates to processes and apparatus for treating organic materials such as fish, fish waste, meat scrap, packing house offal, grains, seeds, olives, nuts, garbage and the like, to extract the oils contained therein, and to manufacture meal from the residue which may be used for food or fertilizer.

More particularly, the invention relates to a continuous process of manufacturing meal and extracting oils from materials of the character above mentioned by the use of a compact, simplified, and novel combination of apparatus, particularly suited for the handling of relatively small quantities of materials efficiently and at a low cost.

In the plant disclosed in Patent No. 1,489,940, issued April 8, 1924, quantities of material as low as two or three tons per hour are handled continuously with economy of operation. Many small establishments, however, do not have sufficient material to warrant the installation of a treating plant of the kind shown in the above mentioned patent. An object of the present invention is to provide a lower priced smaller unit which will handle quantities of one ton or less per hour economically and efficiently, and which at the same time will attain the advantages of continuous, odorless and sanitary operation in the same relations and under the same conditions as set forth in the above mentioned patent.

In processes utilizing steam cookers to cook the materials undergoing treatment before expressing to extract the oil therefrom, such for example as disclosed in the above mentioned patent, a substantial quantity of water is added to the materials by condensation of the steam. This results in losses due to the fact that an appreciable percentage of solid soluble matter, such as proteins and the like, are carried off in solution in the water, thus decreasing the yield of meal. As this water increases the amount of liquid to be removed in the presses, and then must be separated from the oils, the cost of operation is increased and the efficiency is decreased thereby.

A further object of the invention is to eliminate these losses and to increase the efficiency of extraction and the yield of meal by provision of a process in which the step of cooking by steam is eliminated.

To provide for the rapid and efficient handling of the material with apparatus of minimum size and initial cost, the dehydrating or drying step in the present invention is carried out in a novel form of apparatus, and before the oil has been expressed therefrom. The breaking down of the oil bearing cellular structure of the materials is completed simultaneously with the drying by the application of heat and a dividing or pulverizing action. This simultaneous drying, heating and pulverizing apparatus is one of the main elements of the present invention, and forms a very efficient evaporator which may be used independently of the remaining apparatus in other relations, as an evaporator for the continuous production of dried or evaporated milk, tomato paste, dried eggs, and for the drying of grains or any other wet materials rapidly and without leaving an undesirable scorched or cooked taste in the material treated. This dryer or evaporator comprises a fixed heated cylinder in which beaters or paddles revolving at high speed spread the wet material to be treated in thin layers around the interior, and a set of revolving scrapers which immediately remove the material from the heated surfaces, to be again thrown or spread thereon by the beaters or paddles. The scraping and throwing actions are repeated many times a minute, the wet material being started at the hottest end of the cylinder and progressively advanced to cooler portions of the cylinder as the drying proceeds, until the desired degree of dehydration has been attained, when the material is discharged from the evaporator. Because of the nature of treatment is such that the materials are in contact with the heated surfaces for very short intervals only due to the scraping action, the cylinder may be heated to very high temperature resulting in an exceptionally high rate of evaporation and rapid drying without burning or scorching the material. By providing suitable valves at the feed and discharge ends of the evaporator, and suitable exhaust pumps, the operations in the dehydrator may be carried out under a vacuum. The operation of the apparatus is continuous, and the material is finely divided due to the rapid scraping and beating action while the drying proceeds. Material such as milk may be passed through the evaporator and continuously reduced to powder. In the treatment of fish, fish waste or other organic oil bearing materials, as hereinafter set forth, the material is dehydrated, and the oil bearing cells are broken down by the heating, beating and scraping action, so that as it leaves the dehydrator it is a hot mixture of oil and finely divided residue.

The present application relates in particular to the production of oil and meal from organic oil bearing materials, and comprises preferably the steps of reducing the materials to be treated to a uniform or finely divided mass in a suitable device such as a meat grinding type of cutter, impact pulverizer, or like apparatus, passing the material through the dehydrator as above set forth, and passing the dehydrated mass through an expeller or press where the hot oil is separated from the residue. The residue from the expeller is preferably passed continuously to a grinder where it is reduced to a meal of uniform fineness and from the grinder it is passed through a cooler and then to a hopper for immediate sacking. If desired, the grinding may be carried out after the meal has been cooled. The treatment of the dry meal from the expeller may be carried out in the same manner as the treatment of the meal from the dryer in Patent No. 1,489,940, above mentioned, or in any other convenient manner.

The hot oil from the expeller is substantially free from water, and is passed to a treating tank where the gurry of fine solid material is separated and passed back to the expeller by means of a foots conveyor or in any other suitable manner.

Referring to the drawings,

Fig. 3 is a sectional view taken along line BB of Fig. 2, showing the dehydrator scrapers and beaters.

Figs. 4 and 5 show a modified arrangement of the apparatus shown in Figures 1 to 3, whereby a relatively high vacuum may be maintained during the operation thereof.

Figure 1:
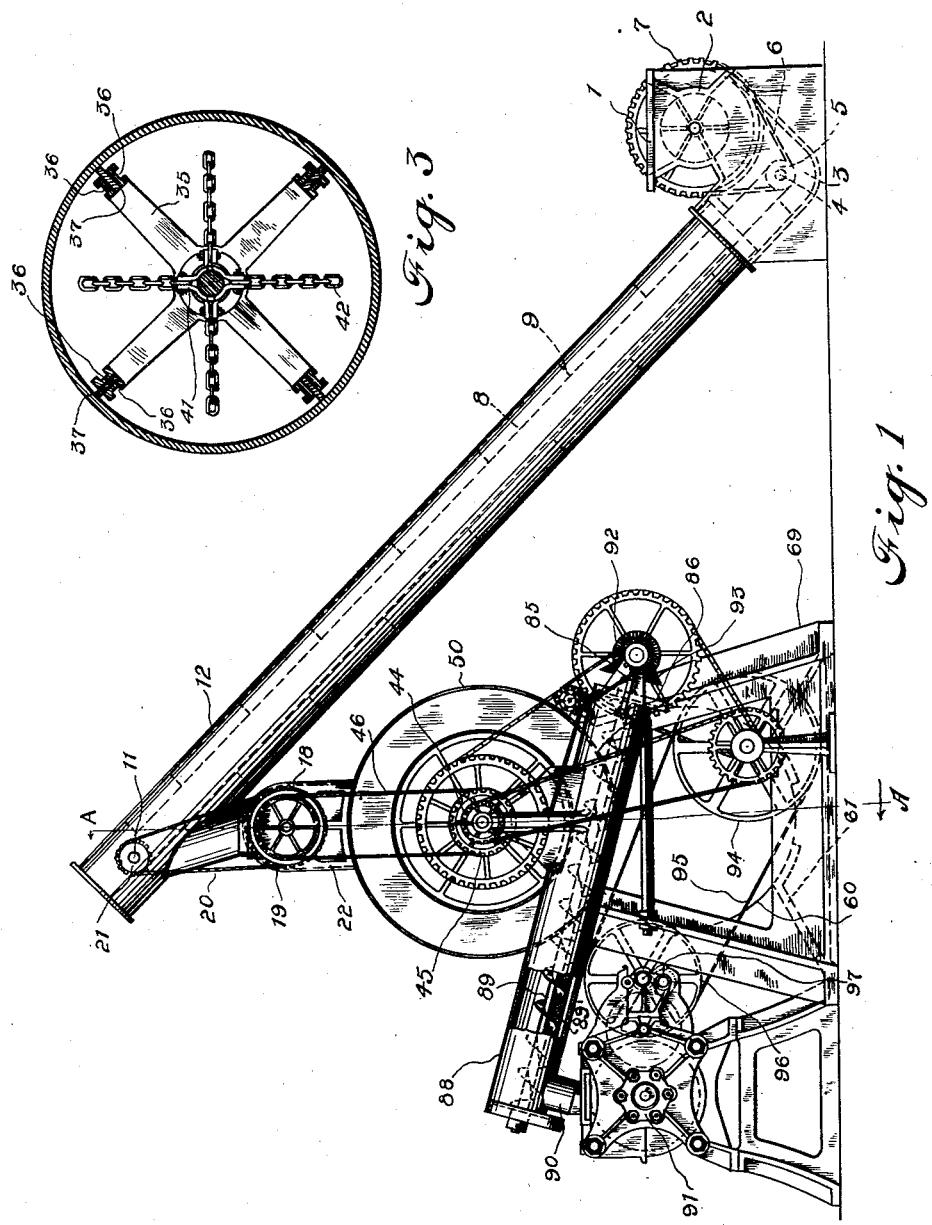
Fig. 1 shows in more or less diagrammatic manner an arrangement of apparatus for carrying out the more important steps in the process as above set forth.

The material to be treated, for example, fish or fish waste is fed into a hopper 1 of a cutter of the meat grinder type or of an impact pulverizer 2, and is there reduced to a substantially uniform mass of finely divided, crushed and mashed particles. This type of cutter is preferably such as to pass the material therethrough at a uniform rate regardless of how it is piled in hopper 1, so that the feed of material out of the cutter is at a constant rate. This aids materially in smooth and efficient operation of the plant as a whole. From cutter 2, the material passes preferably under cover into a conveyor boot 3. Journaled in 3 is a conveyor foot shaft 4 carrying a sprocket 5. Cutter 2 may be driven from shaft 4 by means of sprocket 5 carried thereby through a chain 6 and sprocket 7, as diagrammatically indicated in Fig. 1, or in any other suitable manner. Sprocket 5 is driven by and supports an elevating conveyor chain 8, carrying flights 9. Chain 8 is supported at its upper end and driven by a head sprocket 10, supported on a head shaft 11. This elevating conveyor is preferably enclosed in a casing 12 which joins with boot 3 at its lower end, and with an enclosed discharge hopper 13 at its upper end. Hopper 13 communicates with the feed end of a preheater comprising a feed screw 14 surrounded by a cylindrical casing 15 and suitably journaled in end plates 16 and 17 (Fig. 2). Screw 14 is driven by a sprocket 18, and has mounted thereon a sprocket 19 which drives conveyor-head shaft 11 through a chain 20 and a sprocket 21 mounted on 11. Cylinder 15 is supported in and extends through supporting end plates 22 and 23 which in turn support a heating jacket or encasing sheet 24 in a manner to form a heating jacket for preheater cylinder 15.

At its discharge end cylinder 15 communicates with a passage 25 which in turn communicates with the feed end of dehydrator cylinder 26. Mounted in end plates 27 and 28 are ball or roller bearing units 29 and 30, in which scraper drive sleeves 31 and 32 are rotatably journaled. Secured to sleeves 31 and 32 are driving sprockets 33 and 34 therefor. Fastened to and rotatable with sleeves 31 and 32 are split scraper supporting spiders 35. Supported from the arms of spiders 35 are scraper bar guide and supporting channel irons 36 between which scraper bars 37 are guided and supported. Bars 37 are mounted on springs or other suitable devices, not shown, in a manner to be forced outward from the spiders to scrape against the interior of cylinder 26 as sleeves 31 and 32 are rotated. A central supporting spider 38 is secured to channels 36, and is mounted on a suitable roller or ball bearing center 39, in which a beater or paddle shaft 40 is rotatably mounted. Shaft 40 is suitably journaled in sleeves 31 and 32 and has secured thereto at regular intervals a series of collars 41 to which sections of beating chains, paddles or like devices 42 are secured. Collars 43 secured to shaft 40 limit the end movement thereof. Shaft 40 is extended and has secured thereto a drive sprocket 44 through which it is driven at a high rate of speed, causing the chains or beaters 42 to fly out and rapidly beat the material in cylinder 26. Secured to shaft 40 is a sprocket 45 which drives sprocket 18 through a chain 46. As above set forth sprocket 18 drives feed screw 14, which in turn at its opposite end drives a sprocket 47. Sprocket 47 drives sprocket 34 through a chain 48. Sprockets 33 and 34 drive sleeves 31 and 32 and accordingly scrapers 37, at a relatively slow rate to continuously scrape the material from the interior of cylinder 26 as it is plastered thereon by the rotation of the beaters 42. In practice a speed of rotation of 500 R. P. M. for the beaters, and 10 R. P. M. for the scrapers has given excellent results in the treatment of fish to produce fish meal and fish oil. It will be understood, however, that the speeds may vary widely in practice for the same materials and will be suitably varied to suit the conditions for each kind of material treated. It will also be understood that the relative directions of rotation of the scrapers and beaters may be the same or opposite by the provision of suitable drive arrangements.

To provide for feeding of the material continuously and progressively through cylinder 26, the cylinder is preferably given a slight downward pitch from the right to the left in Fig. 2, and the material when sufficiently dehydrated passes out of the cylinder through an opening 49 in end plate 27. This feed may, however, be effected by providing scrapers slightly helical in form to effect the advance of the material, or by providing fan-like beater blades shaped to throw the material slightly in advance towards the feed end as they rotate.

Cylinder 26 is supported in a cylindrical heat chamber or jacket construction comprising an outer metallic shell 50 lined with suitable fire brick concrete or fire brick 51, or like material. Supporting end walls 52 and 53 for the heat chamber are formed for the ends of cylinder 26, and baffle projections 54 are formed to extend partially around and to support cylinder 26, as shown in Fig. 2. End plates 22 and 23 of the preheater jacket are suported from shell 50 and an opening 55 is formed in the dehydrator heat chamber through which the hot gases may pass into the preheater jacket and may then escape to the atmosphere through stack 56. The lined dehydrator heat chamber is preferably divided, as shown at 57 to permit the complete manufacture of the dehydrator, in portable sections, and to avoid the necessity of pouring the lining at the location where the plant is to be installed. This type of construction gives a readily portable and economical structure which may be manufactured and erected at a minimum cost.

The dehydrator heat chamber is constructed with an inlet opening 58 for entry of hot gases from the combustion chamber 59 of a furnace constructed and arranged to nest with the inlet end of the heat chamber, as shown in Fig. 2. The furnace preferably consists of a metallic shell 60 cylindrical in section, supported on castings 61, and having a suitable lining 62 of fire brick or other material formed therein. A fire door and draft opening 63 of suitable construction is provided, and a burner 64 is provided for the burning of a suitable fuel supply, as for example oil. The burner 64 is arranged so that the flame therefrom impinges on suitable fire brick 65 or other refractory material piled in the combustion chamber 59. A gas outlet opening 66 in passage 25 for gases from cylinder 26 is provided, and is connected by means of a pipe 67 to opening 68 in the furnace. Gases evolved from the material are drawn through opening 66 by the furnace draft. In order to assist the draft and create a vacuum in the chamber 26 an exhaust or suction fan 68' may be introduced in pipe 67 to draw the gases out through opening 66.

Heat chamber shell 50 is supported from suitable castings 69. A line shaft 70 supported from journals 71, and driven from a pulley 72 or in any suitable manner, has mounted thereon a sprocket 73 which drives sprocket 44 on shaft 40, through a chain 74. A sprocket 75 on shaft 70 drives a counter shaft 76 through a chain 77 and a sprocket 78. Carried on counter shaft 76 is a sprocket 79 which through a chain 80 and a sprocket 81 drives a counter-shaft 82, and shaft 82 through sprocket 83 and chain 84 drives the scraper drive sprocket 33. Shaft 76 is supported in journals 85 extending from the end plate 86 of a press feed conveyor, and shaft 82 is supported in journal 87 from press feed conveyor casing 88.

Figure 2:
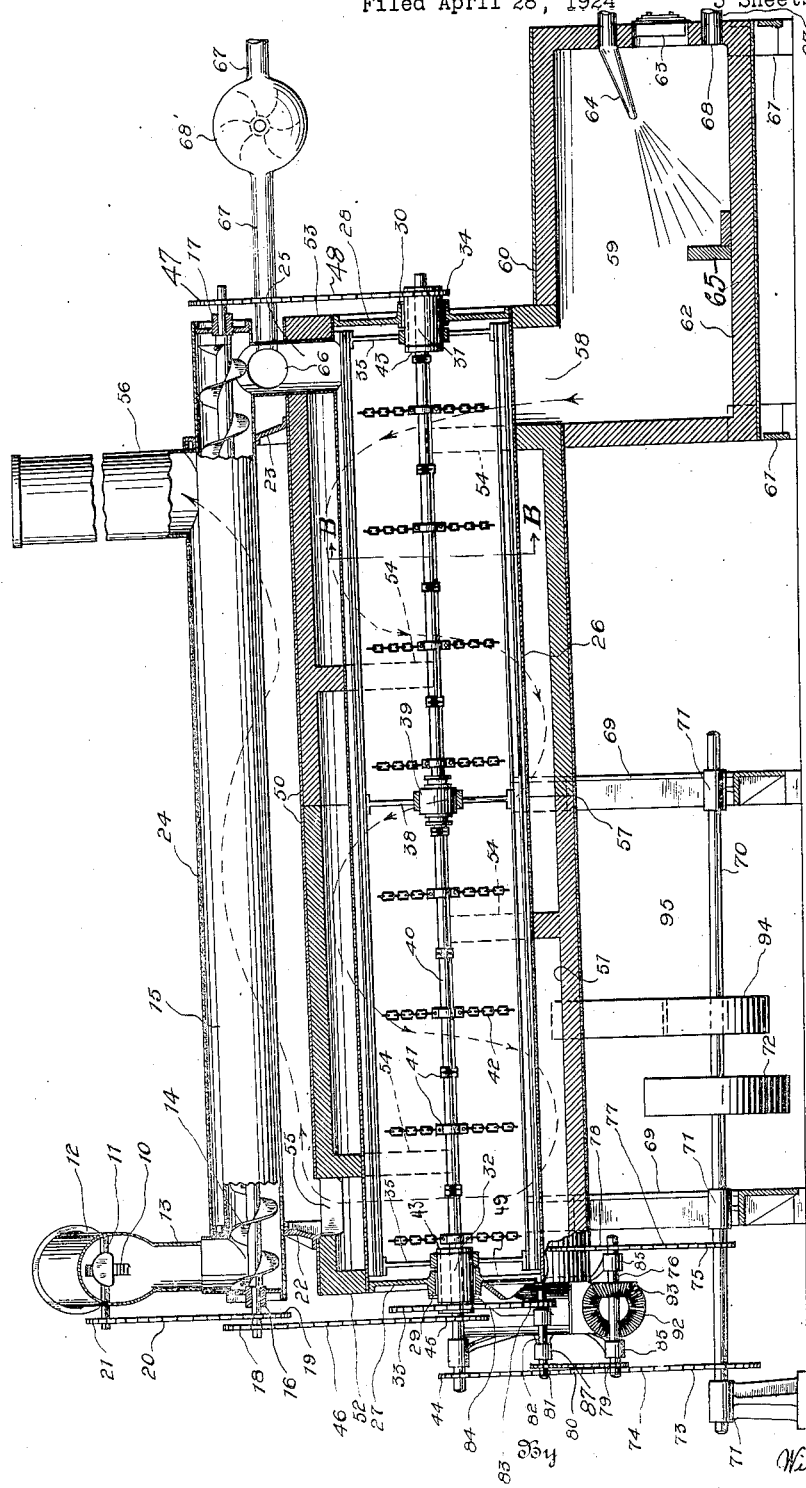
Fig. 2 is a sectional view taken along line AA of Fig. 1, showing the improved dehydrator construction.

Conveyor casing 88 communicates with opening 49 in dehydrator end plate 27, and the arrangement is such that the dehydrated material will drop under cover into casing 88, and will be carried by conveyor screw 89, to the left in Fig. 1, and discharged through passage 90 into press 91. Screw 89 may be driven from shaft 76 through bevel gears 92 and 93. As the material coming from the dehydrator contains a large quantity of hot free oil, casing 88 is inclined and screen or drainage plate 89' is preferably provided in the bottom of the casing 88. As the material passes over the screen the free oil contained therein passes through the screen, flows downward in casing 88 and is with-drawn through suitable connections provided for this purpose. In order to provide a low pressure seal for the discharge end of the dehydrator so that a vacuum may be caused therein by the furnace draft, and by fan 68' when used, screw 89 may be made relatively close fitting in casing 88, so that when the conveyor is filled with material it will act as a low pressure seal. It will also be noted that the preheater may serve in the same way for a low pressure seal at the feed end, so that a partial vacuum may be established in the dehydrator when this is desirable.

Press 91 may be of any well known form of high pressure expressing device in which the oil is continuously and thoroughly pressed out of the materials. Pulley 94 on shaft 70 may drive expeller 91 through belt 95, pulley 96, shaft 97, and suitable gearing, or any other convenient drive means may be provided.

The oil separated from the solid residue in the press 91 is collected in a treating tank where fine solid material or gurry is separated therefrom and returned to the material being fed through the press by a foots conveyor, not shown, or in any other suitable manner. The solid residue discharged from the press is hot and dry, and is preferably passed through a grinder and reduced to a uniform fineness, passed through a cooler, and then sacked for shipment. This solid material from the press is in substantially the same condition as the material coming from the dryer in Patent No. 1,489,940, and the apparatus for grinding and cooling may therefore be the same as that from the dryer or in the above mentioned patent.

In cases where it is desired to operate the dehydrator under a high vacuum, continuously operating feed and discharge valves, such for example as are shown for the feed and discharge valves of the pressure cooker in Patent No. 1,489,940, and in the vacuum arrangement described in copending application, Serial Number 656,095, filed August 6, 1923, may be utilized. In this case as shown in Fig. 4, end plates 22 and 23 are lengthened and a rotary feed valve 98 of the character shown in the copending case and suitably driven in properly timed relation with the remaining apparatus by a sprocket 99 or in any other convenient manner is interposed in connection 25 between opening 66 and casing 15. The connection between the discharge opening 49 of cylinder 26 and press feed conveyor casing 88 is lengthened as shown in Fig. 5, and a discharge valve 100, similar in structure to charge valve 98, and driven in properly timed relation by a sprocket 101 is provided therein. It will be understood that the valves 98 and 100 are driven to effect the feed and discharge of materials into and from the dehydrator at a proper rate without permitting external pressure to enter into body 26, and that when these valves are used, a high vacuum may be maintained in the dehydrator due to the withdrawal of gases by fan or pump, 68'.

*Operation.*

In operation the entire apparatus including the valves when used, is driven at proper relative speeds preferably from a single prime mover so that each part will operate in definite timed relation to perform its individual function at a proper rate for continuous automatic treatment of materials.

Fuel supplied through burner 64 is ignited and heated gases of combustion pass upward from chamber 59, through opening 58 and are circulated through the dehydrator heating chamber around the exterior of cylinder 26, passing to the left around baffle walls 54 and cylinder 26, as shown by the broken line arrow until they pass through opening 55 into the preheater jacket. In the preheater jacket the gases pass to the right and out through stack 56. It will be noted that the hottest gases contact with cylinder 26 at the right or feed end in Fig. 2, and as they pass to the left they are progressively cooled by the transfer of heat to the cylinder 26 and the contents thereof so that by the time they reach cylinder 15, the temperature has been reduced to a point where burning of the materials passing therethrough will be avoided.

The material to be treated, for example fish, or fish waste, is piled in more or less irregular quantities in hopper 1, and is reduced by cutter or pulverizer 2 to a mass of fine crushed pulplike particles of substantially uniform size, and is fed into conveyor boot 3 at a uniform rate. It is then carried upward at a uniform rate by the elevating conveyor and discharged through hopper 13 into the preheater and is carried by screw 14 to the right in Fig. 2 through cylinder 15 where it is heated due to the action of the gases surrounding this cylinder. From 15 the preheated materials drop into valve 98 when used, and then through passage 25 into dehydrating cylinder 26. When valve 98 is not used the material passes directly into passage 25 from casing 15.

As the wet heated material enters cylinder 26, the beaters or paddles 42 strike it and throw or splash it against the very hot interior surface of 26. As the wet material contacts with the heated surface, a protective cushion of vapor forms which prevents immediate burning thereof and sticking of the material to the surface, and before this protective cushion is dissipated, scrapers 37, scrape the material off the heated surfaces and fresh material is immediately splashed thereon by the beaters. The material scraped off is lifted upward by the scrapers and channels 36 and 37, falls through the cylinder, is mixed with the remaining material and again splashed or thrown against the heated surface. This action is repeated many times a minute and results in constantly changing surfaces of the material being contacted with the very hot cylinder surface, and the result is a very rapid evaporation of moisture contained in the materials without, however, resulting in any burning thereof.

Due to the inclination or pitch of cylinder 26, the material is continuously advanced to the left in Fig. 2, as it is splashed, heated, scraped and thoroughly mixed, and as it advances the moisture is progressively removed, until the material is discharged through opening 49, through valve 100 when used, or directly into press feed conveyor casing 88. As the material is advanced and becomes dehydrated it is contacted with progressively cooler areas of cylinder 26, so that burning of the material is avoided as it dries, but the temperatures are such as to give a more rapid rate of heat transfer and evaporation than could be attained if cylinder 26 were uniformly heated. The heating, beating and scraping action results in a thorough breaking down of the oil bearing cellular structure, frees the oil from the cells so that when the material is discharged into the press feed conveyor it is a mixture of hot free oil and fine solids, substantially free from water. The action of the scrapers and beaters in dividing and breaking down the material is comparable to that which would be attained in a relatively low speed impact pulverizer.

The vapors and gases driven from the materials in cylinders 15 and 26 are drawn through openings 66 in connection 25, through pipe 67, and opening 68 by the furnace draft. This action is assisted by fan or pump 68' when used, and when valves 98 and 100 are used, the evaporation or dehydration may be carried out in a relatively high vacuum with correspondingly increased efficiency. The combustible elements of the gases are completely oxidized and consumed, and then pass with the gases of combustion through the jackets and out of the stack. This results in a substantially complete deodorization of the gases discharged from the treated materials, utilizes the heating value of the combustible elements thereof, and makes the process substantially odorless, so that it may be operated in the vicinity of residences, food canneries and like locations where objectionable odors constitute a serious nuisance.

The mixture of hot solids and oil is carried continuously by screw 89 to press 91, through which they pass and are subjected to high pressures to separate the oil and the solids. The oil is then led off into a treating tank to separate the gurry therefrom, and the gurry is passed back to the press by a conveyor or other suitable means, and mixed with the hot material from the dehydrator. The hot dry solid residue discharged from the press may be ground to break up any cakes or lumps which may have formed in the press and to reduce the mass to uniformly fine meal, and then may be cooled and sacked for shipment. The treatment is such, however, that cooling is not essential.

It will be noted that no water is added to the material in carrying out the process and accordingly there is no loss due to solids passing into solution, and no necessity for separating large quantities of water from the oil. On the contrary the water content is substantially entirely removed in the dehydrator. For example, it is found that the fish comprise approximately seventy per cent of water or moisture, and about thirty per cent oils and solids. In the dehydrator, the water content is removed down to about five or six per cent or less in the treatment of fish. The apparatus requires no steam generating equipment, although steam jackets may be used to heat the cylinders 15 and 26 if desired. The use of the heated gases as disclosed however, gives a more efficient heat transfer arrangement and is preferable.

Having described preferred embodiments of the invention, what is desired to be secured by Letters Patent and claimed as new is:

1. A process of rendering solid fat and oil containing materials which comprises the steps of continuoulsy advancing said materials through an enclosed space with heated walls; splashing the materials against the walls of said enclosed space; quickly removing the material from said walls into said space; and repeating the splashing and removing steps in rapid succession as the material advances through the enclosed space.

2. A process of rendering solid fat and oil containing material which comprises the steps of feeding the material into the path of high speed beaters; splashing the material against the interior surface of a heated cylinder; removing the material from said surface at relatively lower speed and dropping the removed material back into the path of the beaters to be mixed and again splashed back against the heated surface; repeating the steps of splashing, mixing and removing in rapid succession until rendering of the material has been effected; and continuously advancing the material through said cylinder while the splashing, mixing and removing proceeds.

3. The process as set forth in claim 1 together with the step of continuously exhausting the gases evolved from the materials.

4. The process as set forth in claim 1 in which the temperature of the heated walls is decreased along the path of advance of said materials.

5. The process as set forth in claim 1 in which the walls of said enclosed space are heated to high temperatures by the direct application of heated products of combustion to the exterior thereof.

In testimony whereof, I affix my signature.

STANLEY HILLER.